United States Patent [19]

Kimmich

[11] Patent Number: 4,688,888
[45] Date of Patent: Aug. 25, 1987

[54] OPTICAL CABLE

[75] Inventor: Klaus Kimmich, Stuttgart, Fed. Rep. of Germany

[73] Assignee: Alcatel N.V., Amsterdam, Netherlands

[21] Appl. No.: 612,098

[22] Filed: May 18, 1984

[30] Foreign Application Priority Data

May 28, 1983 [DE] Fed. Rep. of Germany ....... 3319433

[51] Int. Cl.⁴ .............................................. G02B 6/44
[52] U.S. Cl. .............................. 350/96.23; 174/110 R
[58] Field of Search ................ 350/96.23; 174/110 R, 174/110 F

[56] References Cited

U.S. PATENT DOCUMENTS

| 4,241,979 | 12/1980 | Gagen et al. | 350/96.23 |
|---|---|---|---|
| 4,342,500 | 8/1982 | Oestreich et al. | 350/96.23 |
| 4,443,657 | 4/1984 | Hill et al. | 350/96.23 |
| 4,447,122 | 5/1984 | Sutehall | 350/96.23 |
| 4,515,435 | 5/1985 | Anderson | 350/96.23 |
| 4,534,618 | 8/1985 | Bruggendieck | 350/96.23 |
| 4,541,686 | 9/1985 | Barfuss et al. | 350/96.23 |

FOREIGN PATENT DOCUMENTS

| 0042996 | 1/1982 | European Pat. Off. | 350/96.23 |
|---|---|---|---|
| 3112422 | 10/1982 | Fed. Rep. of Germany | 350/96.23 |
| 0145644 | 12/1978 | Japan | 350/96.23 |
| 1601005 | 10/1981 | United Kingdom | 350/96.23 |

*Primary Examiner*—William L. Sikes
*Assistant Examiner*—Frank González
*Attorney, Agent, or Firm*—Peter C. VanDerSluys

[57] ABSTRACT

In an optical fiber cable with a core consisting of at least one optical waveguide (3) having a primary and secondary coating and an additional element (1), the core is surrounded by a flexible supporting tube (4, 5) disposed at a distance therefrom. The supporting tube is produced from at least one overlappingly wound high-temperature-resistant foil (4). It is covered with the cable sheath (6).

10 Claims, 4 Drawing Figures

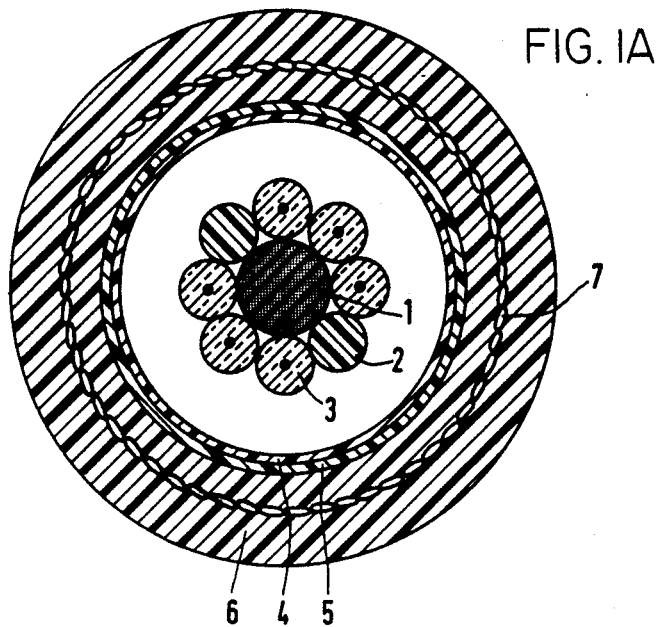
FIG. IA
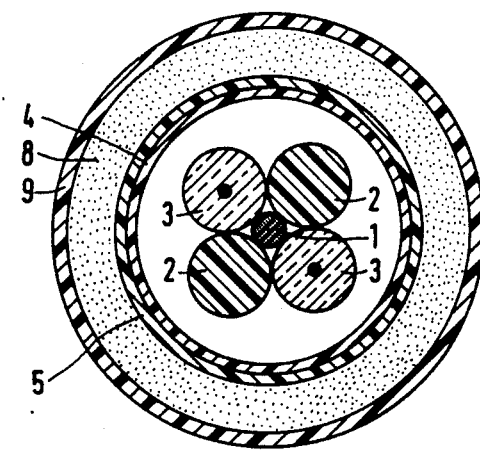
FIG. 3

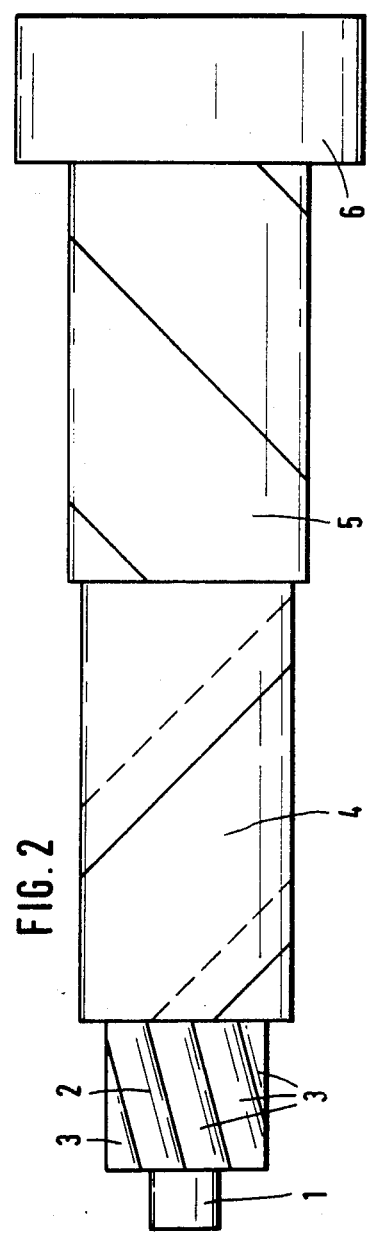
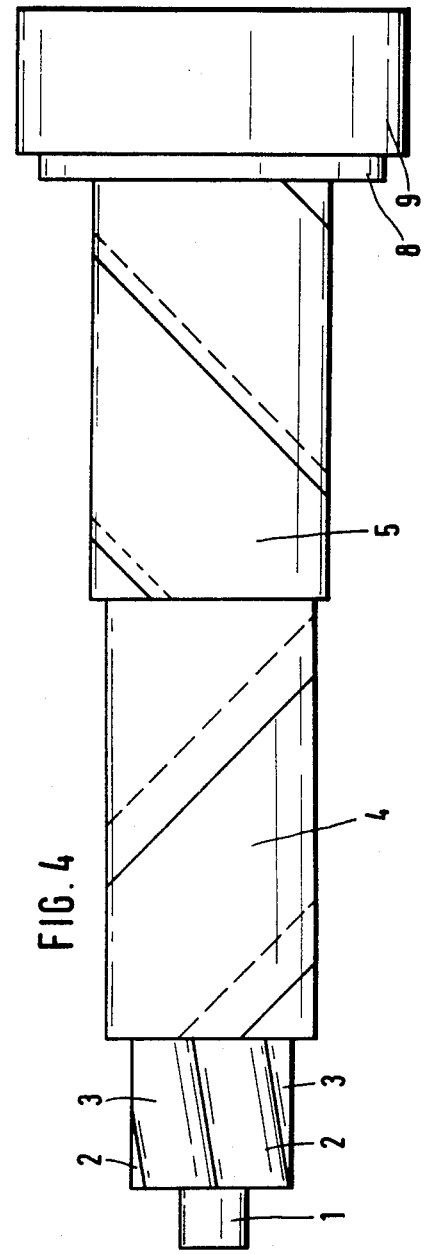

OPTICAL CABLE

BACKGROUND OF THE INVENTION

The present invention relates to an optical cable and more particularly to a cable including a core, having a central element around which at least one coated optical waveguide is stranded, and a cable sheath.

From the German Pat. No. 30 02 498 there is known a communication cable comprising several optical waveguides which each have a primary and a secondary coating and which, together, are stranded about a central element to form a core. Around this stranded core there is placed a retaining helix by which the core is to be held together. Since the retaining helix is seated firmly on the optical waveguides, there is a danger of forces being exerted thereon by which they are mechanically stressed. In order to avoid a deformation of the optical waveguides, the communication cable is filled with a filler which either softens the material of the retaining helix or causes the decomposition thereof, so that the retaining helix exerts forces upon the optical waveguide only during the manufacture of the communication cable.

As is well known, every dielectric waveguide radiates as soon as its axis deviates from a straight line. The radiation is very much dependent on the radius of curvature and, from negligibly small values rapidly increases to losses which are no longer acceptable. In the case of monomode optical waveguides there is still added to this the disadvantageous influence upon the critical wavelengths of modes of different order.

It is the object of the invention to provide an optical cable in which there are not only eliminated the forces coming from the cable structure, but in which also the forces acting from the outside are kept away from the optical waveguides.

SUMMARY OF THE INVENTION

These objects and others which will become apparent hereinafter are accomplished by the present invention which provides an optical cable which includes a core including a central element and at least one coated optical waveguide stranded around the central element, a flexible supporting tube spaced a radially outward distance from the core and a sheath surrounding the support tube. The tube includes an inner layer of foil wound with a twist, the length of which is smaller than ten times the diameter of the core and twice the width of the inner layer, and an outer layer of foil which is wound with an opposing twist to that of the inner layer.

With the optical cable according to the invention, the radially effective forces coming from the outside are absorbed by the supporting tube provided for at a distance from the optical waveguides. Such forces originate either already during the manufacture of the cable sheath or appear additionally during the drum rewinding or the laying of the cables. Since the core of the optical waveguides positioned within the supporting tube is not provided with a taping, wrap or helix, the one or more optical waveguides are free to expand and, accordingly, to form a core free from forces.

It is to be noted that from the German Pat. No. 30 10 353 it is known with respect to an optical transmission element, to dispose one fiber of an optical waveguide loosely inside a sheathing composed of an inner and an outer covering. This arrangement is also known as a "hollow conductor". In this case, the inner covering consists of one or more foils wound with a twist, onto which the outer covering is extruded.

BRIEF DESCRIPTION OF THE DRAWING

The invention will now be explained in greater detail with reference to two examples of embodiment shown in FIGS. 1 to 4 of the accompanying drawings, in which:

FIG. 1A is a cross sectional view of a first type of optical cable including a braid.

FIG. 2 shows a set-off end of the cable as shown in FIG. 1,

FIG. 3 is a cross sectional view of a second type of optical cable, and

FIG. 4 shows a set-off end of the cable as shown in FIG. 3.

DETAILED DESCRIPTION OF THE PREFERRED EMBODIMENT

Figure 1B:
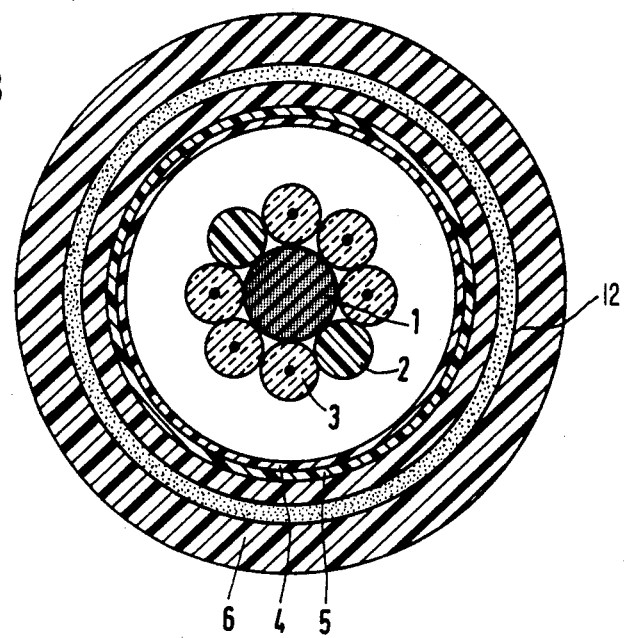
FIG. 1B is a cross-sectional view of the first type of optical cable including reinforcing fibers.
Figure 1C:
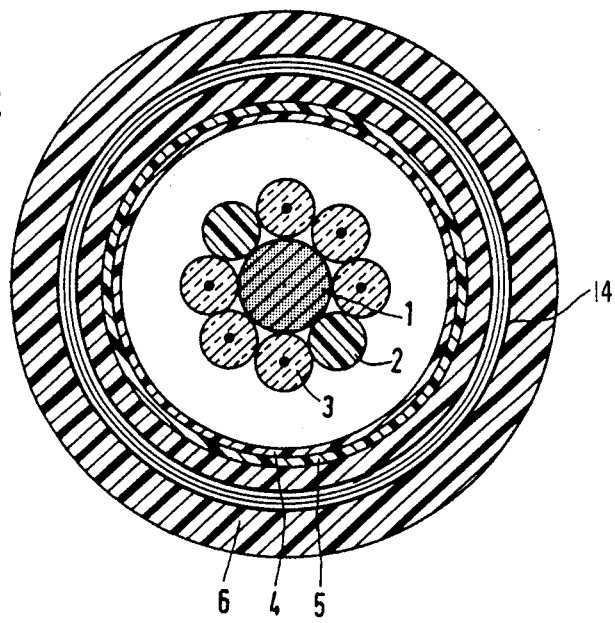
FIG. 1C is a cross-sectional view of the first type of optical cable including a tape network.

The optical cable as shown in FIG. 1 has a central element 1 which may be designed as a tension-proof element and consists of a glass fiber yarn. Six optical waveguides 3 and two dummy elements 2 are stranded onto the element 1. The number of optical waveguides 3 and of the dummy elements 2 is only given by way of example, and it is equally well possible to use any other number of optical waveguides 3 with or without the corresponding dummy elements 2. The optical waveguides 3 are primary- and secondary-coated optical waveguides. The dummy elements 2, acting as fillers, have the same diameter as the optical waveguides 3 and consist, for example, of polyamide. This cable core consisting of the central element 1, of the optical waveguides 3 and of the dummy elements 2 is disposed in a freely movable manner inside a flexible supporting tube 4, 5.

The flexible supporting tube 4, 5 consists of a high-temperature-resistant inner foil 4 and of a high-temperature-resistant outer foil 5, called "cover foil". The inner foil 4 is resistant to bending, about 75 $\mu$m thick, and consists of polyethylene terephthalate (PETP). This foil is wound with an opposing twist and overlappingly in relation to the core, and forms the flexible supporting tube. The length of twist is smaller than ten times the diameter of the core. Moreover, the length of twist may correspond to twice the width of foil 4. In this way, there is obtained a sufficient overlap. The cable sheath may be applied directly over this inner foil 4. In order to prevent the supporting tube as wound from the foil 4 from springing open on account of the foil which is actually resistant to bending, the cover foil 5 is wound thereon.

This cover foil 5 consists of a 0.4 mm thick foam laminate of polyethylene terephthalate (PETP). It is wound on to the foil 4 with an opposing twist. The length of twist is chosen such that there will result either a butt joint or a slight lap-joint taping. The joint 5 at the same time covers the gaps of the foil 4, so that during the application of a cable sheath which is either plastic or liquid during the application, material is prevented from flowing into the supporting tube and eventually from reaching the optical waveguides.

The sheath 6 is tension-proof. Its tension-proof elements may consist of threads 12 extending parallel in relation to one another, of a braid 7, or of a tape network 14. The cable sheath is directly deposited onto the supporting tube consisting of the foils 4 and 5.

FIG. 2 shows one end of the optical cable of FIG. 1, of which the cable sheath 6 and the portions of the cable lying therebelow have been partly removed. It can be recognized that the foil 5 is wound with a butt joint, and that the foil 4 is wound with a lap joint, and that both the optical waveguides 3 and the foils are each wound with an opposing twist.

FIG. 3 is the cross sectional view of a further type of optical cable. The microbending sensitivity of optical cables, besides on their construction, decisively depends on the thermal coefficient of expansion of the entire cable structure. Since optical cables substantially consist of plastic material having a relatively high expansion coefficient, a special construction has been chosen for the purpose of improving the low-temperature properties. In the following there is described a metal-free lightweight cable which cannot be influenced by electric fields and which is highly protected against lightning. In the cable of FIG. 3, the core consists of two optical waveguides 3 which, together with two dummy elements 2, are stranded about a central element 1. The central element 1, in this case, merely serves as the stranding base. The supporting tube arranged thereon at a spaced relation again consists of the two foils 4 and 5. In this case, also the cover foil 5 is wound with an overlap. The cable sheath 8 consists of a cured resin system with oriented reinforcing fibers being embedded therein as the armour. The sheath 8 is covered with a protective sheath 9 which may consist, for example, of polyethylene (PE) which may be mixed with soot.

FIG. 4 illustrates one end of the cable as shown in FIG. 3, from which the protective sheath 9 and the portions of the cable lying therebeneath have been partly removed. It can be seen that the optical waveguides 3 and the dummy elements 2 are stranded, that the foils 4 and 5 are wound overlappingly, and that these three parts are applied with an opposing twist in relation to one another.

There may also be chosen a core consisting of one or more non-stranded optical waveguides, in which longitudinally extending threads are used as tensile (strength) members. The supporting tube consisting of at least one overlappingly wound high-temperature-resistant foil is advantageously manufactured together with the core. For this purpose, there are used one or more high-speed central spinning machines with the aid of which it is possible to achieve a high production speed. For the purpose of applying the supporting tube, the central spinning machines may be provided with a tuning-fork-like winding mandrel.

I claim:

1. An optical cable comprising:
   a core including a central element and at least one coated optical waveguide stranded around said central element, said waveguide being free to expand to substantially eliminate radial forces in said core;
   a flexible supporting tube surrounding said core and spaced a radially outward distance therefrom, said tube including
      an inner layer of foil having overlapping longitudinal edges and being high-temperature resistant and resistant to bending, said layer being wound with a twist, the length of the twist being smaller than ten times the diameter of said core and twice the width of said inner layer,
      an outer layer of foil wound on the outside of said inner layer and having longitudinal edges, said outer layer being wound with an opposing twist to that of said inner layer and being high-temperature resistant; and
   a sheath surrounding the outer surface of said supporting tube and including tension-proof elements therein.
2. The optical cable as claimed in claim 1, wherein said sheath includes a cured resin system with oriented reinforcing fibers embedded therein as an armor.
3. The optical cable as claimed in claim 1, wherein said tension-proof elements in the sheath include either one of a braid or a tape network.
4. The optical cable as claimed in claim 1, wherein said inner foil layer includes polyethylene terephthalate (PETP).
5. The optical cable as claimed in claim 1, wherein said outer foil layer includes a foamed foil.
6. The optical cable as claimed in claim 5, wherein said outer foil layer includes a polyethylene terephthalate (PETP) foam laminate.
7. The optical cable as claimed in claim 1, wherein said inner foil layer has a thickness of 75 $\mu$m.
8. The optical cable as claimed in claim 1 wherein the longitudinal edges of said outer layer are in abutting relationship.
9. The optical cable as claimed in claim 1 wherein the longitudinal edges of said outer layer are in overlapping relationship.
10. An optical cable comprising:
    a core including a central element, at least one coated optical waveguide and a plurality of tension proof elements, said waveguide and said elements surrounding said central element;
    a flexible supporting tube surrounding said core and spaced a radially outward distance therefrom, said tube including
       an inner layer of foil being resistant to bending and high-temperature and being wound with a twist, said foil having overlapping longitudinal edges, the length of the twist being smaller than ten times the diameter of said core and twice the width of said inner layer,
       an outer layer of foil wound on the outside of said inner layer and having longitudinal edges, said outer layer being wound with an opposing twist to that of said inner layer and being high-temperature resistant; and
    a sheath surrounding the outer surface of said supporting tube.

* * * * *